Aug. 29, 1933.　　　R. B. LEWIS　　　1,924,866
TESTING MACHINE FOR BEAMS
Filed Nov. 8, 1929　　2 Sheets-Sheet 1
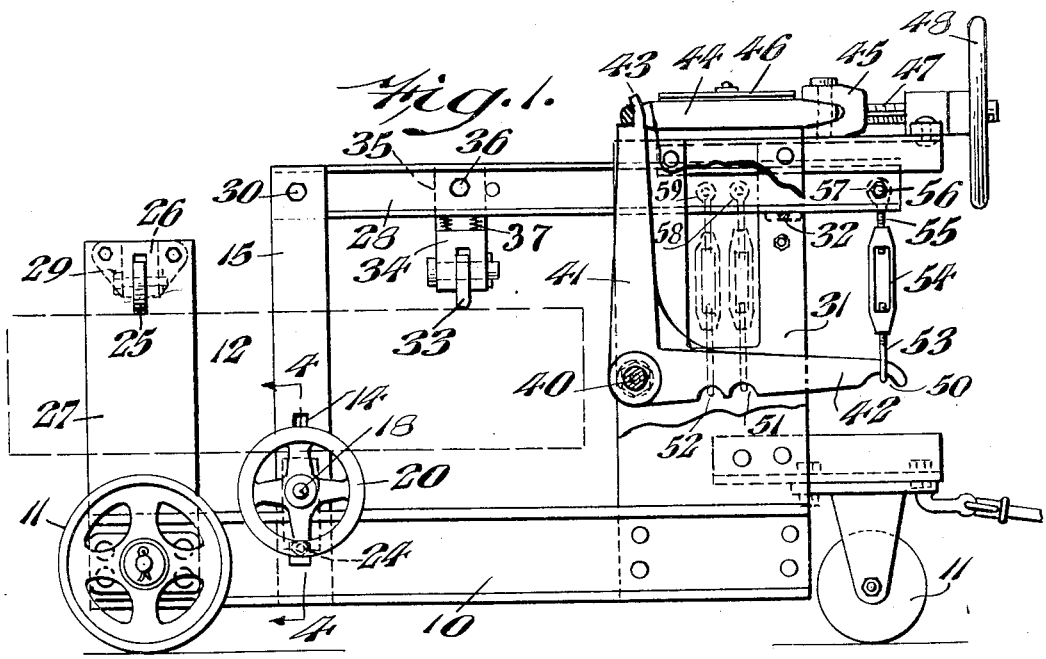
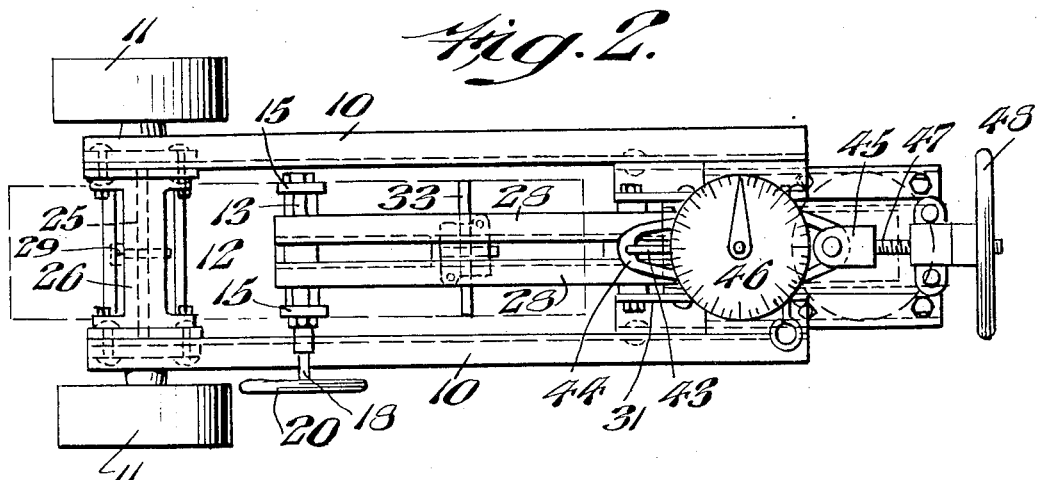
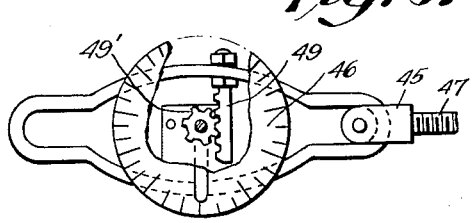
INVENTOR.
Robert B. Lewis,
BY Robert M. Barr.
ATTORNEY.

Aug. 29, 1933.   R. B. LEWIS   1,924,866
TESTING MACHINE FOR BEAMS
Filed Nov. 8, 1929   2 Sheets-Sheet 2
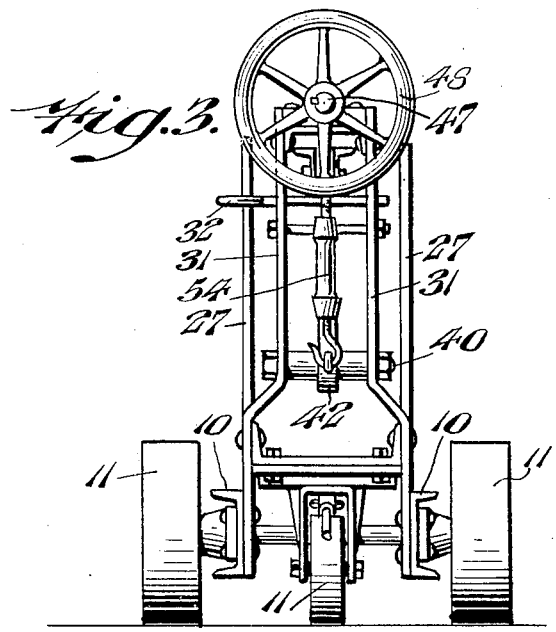
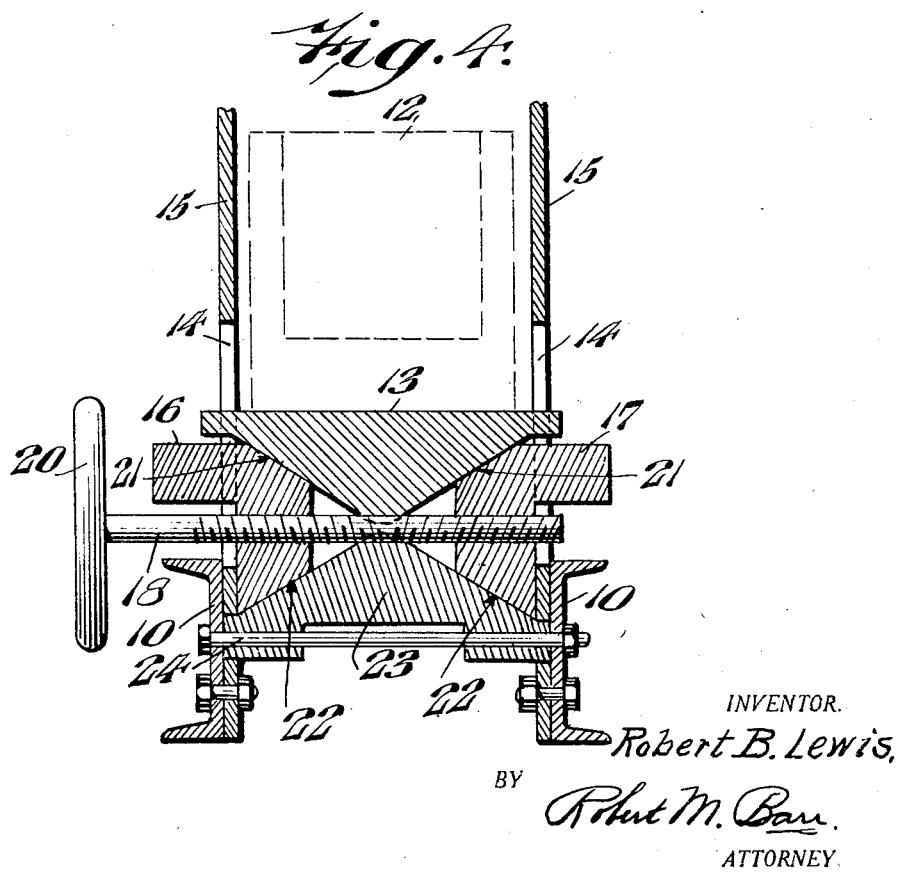
INVENTOR.
Robert B. Lewis,
BY
Robert M. Barr.
ATTORNEY Patented Aug. 29, 1933

1,924,866

UNITED STATES PATENT OFFICE 1,924,866

TESTING MACHINE FOR BEAMS

Robert B. Lewis, Philadelphia, Pa., assignor to Tinius Olsen Testing Machine Company, Philadelphia, Pa., a corporation of Pennsylvania Application November 8, 1929. Serial No. 405,605

10 Claims. (Cl. 265—19)

The present invention relates to testing machines and more particularly to a machine for testing the transverse strength of bars and beams.

In testing machines of the character here under consideration, as heretofore constructed the field of testing is restricted to beams of one sectional dimension because each machine is designed to indicate the modulus of section directly for only that particular sectional dimension. Thus considering the formula for a cantilever beam $$P = 1/6 \frac{Rbd^2}{l}$$

as applied to a 6″ x 6″ beam where

P=Breaking load
R=Modulus of rupture of section in pounds per unit of section
b =breadth
d =depth
l =length by substituting in the above formula P=R when l=36″

Hence with a machine designed with a thirty-six inch lever length for testing 6″ x 6″ beams only, any variation from this sectional dimension cannot be tested to give a direct reading of the modulus of section. To make this entirely clear it may be stated that a 6″ x 8″ beam requires a lever length of 64″ when P=R; and an 8″ x 8″ beam requires a lever length of approximately 85″ when P=R. These lever lengths are prohibitive as far as practical commercial use is concerned and it is for that reason the one dimensional machine has been more or less standard.

Some of the objects of the present invention are to provide an improved machine for the transverse testing of beams; to provide a testing machine wherein beams of different sectional dimensions can be accurately tested; to provide a weighing system wherein the modulus of section corresponding to a beam section can be directly read for each beam size tested; to provide a beam testing machine including a compound lever mechanism for testing beams of different section and giving a direct reading of the modulus corresponding to the section under test; and to provide other improvements as will hereinafter appear.

In the accompanying drawings Figure 1 represents a side elevation, partly broken away, of a testing machine embodying one form of the present invention; Figure 2 represents a plan of the same; Figure 3 represents a front elevation of the machine; Figure 4 represents a section on line 4—4 of Figure 1 on an enlarged scale, and Fig. 5 is a plan view of the particular type of dynamometer employed.

Referring to the drawings one form of the present invention consists of a main frame 10, preferably of channel bar construction, mounted upon wheels 11 so that the machine can be readily drawn from one place to another for testing purposes.

For supporting a test beam 12 upon the frame 10, a knife edge member 13 extends transversely of the frame 10, its ends riding respectively in vertical slots 14 of side standards 15 which rise from the longitudinal side channels of the frame. The member 13 is mounted for vertical adjustment by forming its lower portion V-shaped to seat upon two leader blocks 16 and 17 spaced apart but arranged to be fed towards or away from each other by a feed screw 18 threaded through them and operated by a hand wheel 20. These leader blocks have upper and lower inclined faces 21 and 22 respectively, the former abutting the member 13 and the latter abutting complemental faces of an inverted V-shaped member 23, which is held fixed by a bolt 24 securing it between the side frames 10. The construction thus becomes a double adjustable wedge one acting to bring the knife edge member 13 to the desired level to receive the test beam thereon.

For retaining the test beam 12 in position during the application of the testing force, the top of the test beam is arranged to rest against a self-seating bar 25 pivotally mounted transversely of the machine on a pivot bolt 29 passing through a slotted head 26 which is bolted between two upright side plates 27 rising from the respective side channels of the frame 10. Thus in test position the beam is held firmly between the bar 25 at its top and the knife edge member 13 at the bottom, while the free end of the beam extends forwardly of the machine into position to be acted upon by the applied force.

The testing force is applied in the present instance by a cantilever action through the medium of a lever beam 28 pivoted at one end between the uprights 15, the axis of the pivot 30 lying in the same vertical plane as the knife edge member 13. The free end of the lever beam 28 passes between two upright plates 31, rigidly carried by the frame 10, and rests, when not in use, upon a removable eye-bolt 32 which passes through the two plates 31. Intermediate the length of the lever beam 28, and spaced from the pivot 30 a distance to bring the applied force at the selected location upon the test beam, there is a round edge bar or V-block 33 swivelled in a yoke 34 to extend across the top of the test beam. The yoke 34 is suspended by an ear 35 from the lever beam 28 by means of a bolt 36 which serves as a pivot for the yoke 34 and allows the latter to automatically maintain its normally vertical position. Coil springs 37 are compressed between the beam 28 and the yoke 34 to ensure the proper and desired self adjustment of the V-block 33 when it is moved by the lever beam 28 in applying the test load. These springs 37 are respectively seated in pockets in the yoke 34.

For applying the testing force to the beam 28, a bell crank lever is pivoted at 40 between the plates 31 and has one arm 41 extending vertically upward between the spaced channel members which form the beam 28, and another arm 42 extending forwardly and substantially parallel to the beam 28. The arm 41 terminates in a finger 43 to grasp the yoke 44 of a dynamometer which includes a yoke 45, the indicating scale 46, power screw 47, and operating wheel 48. The dynamometer here shown by way of example is the ordinary Chatillon type wherein the yoke member 44 is in the form of a loop, one branch of which mounts the scale indicator and the other branch of which carries a rack 49 for coaction with a rack pinion 49′ operatively mounted to swing the indicator arm in accordance with the movement of one side of the loop toward the other side. This action of the loop is brought about by its elongation through the pull of the operating wheel 48 and power screw 47. The arm 42 is provided with a plurality of notches 50, 51, and 52, each of which is arranged to seat the hook 53 of a turnbuckle 54 having its eyebolt 55 arranged for connection to the lever beam 28 by a bolt 56. The bolt 56 is for insertion in any one of a number of holes 57, 58 and 59 through the lever beam 28 and each is located a predetermined distance from the beam pivot 30 in order to give a definite leverage when the machine is operated. In the construction here shown by way of example three positions of the turnbuckle 54 are shown, and since the notches 50, 51 and 52 are respectively opposite the holes 57, 58 and 59, a change of the turnbuckle from hole 57 and notch 50 to hole 58 and notch 51, or to hole 59 and notch 52 will result in a change of leverage having a very definite meaning and result. Thus when the turnbuckle 54 is located between the hole 57 and the notch 50 it will correspond to a lever length of thirty-six inches in the formula heretofore given for the test of a six inch by six inch beam; when the turnbuckle 54 is placed between the hole 58 and the notch 51 it will act through the lever system with the effect of a lever length of sixty-four inches for the test of a six inch by eight inch beam; and when the turnbuckle 54 is placed between the hole 59 and the notch 52 it will act through the lever system with the effect of a lever length of eighty-five inches for the test of an eight inch by eight inch beam. Assuming a six by six concrete beam to be tested the turnbuckle 54 is placed in the position shown in full lines Fig. 1 to give the action of a lever beam length of thirty-six inches which substituted in the formula $$P = 1/6 \frac{Rbd^2}{l}$$

gives $P = R$ or a direct reading upon the dynamometer indicator 46 of the modulus of rupture of the section in pounds per unit of section. By shifting the turnbuckle 54 to other predetermined and fixed locations the lever system can be set to give a like direct reading for beams of different section, each position of the beam corresponding to one particular beam section.

It should also be noted that the three pivotal points (the pivot 30, the bolt 36 and the bolt 56) are all in the same straight line, and therefore a new and highly desirable result is obtained, namely any angular movement of the lever beam 28 will produce the same proportional changes in length in each lever and a constant ratio is maintained at all times. Or as differently expressed, the ratio of the lever system is unaffected by angularity of the lever beam. With any different pivotal construction, different lever arms result from oscillating of the lever, and corresponding inaccuracies are present in the test results.

It will now be apparent that a complete unitary machine has been devised for testing the breaking strength of beams accurately and with a direct reading of the breaking load. Also it is a machine having flexibility in use since it incorporates a novel means for converting a lever system to correspond to the section of the beam under test, all of which is carried out in a compact machine without using levers of impractical length.

Having thus described my invention, I claim:

1. In a testing machine, a frame, a test beam support carried by said frame, a lever beam, means actuated by said lever beam for placing a test beam under load, a force applying mechanism associated with said lever beam, means between said mechanism and said lever beam settable to vary the force transmitted to said lever beam from said mechanism, and means so proportioned to said varying means as to indicate in predetermined terms the applied force required to break said test beam.

2. In a testing machine, a frame, a test beam support carried by said frame, a lever beam, means actuated by said lever beam for placing a test beam under load, a force applying mechanism, and means manually adjustable between said mechanism and said lever beam to give a definite lever length to act upon a test beam of certain sectional dimension.

3. In a testing machine, a frame, a test beam support carried by said frame, a lever beam, means actuated by said lever beam for placing a test beam under load, a force applying mechanism associated with said lever beam, means manually adjustable between said mechanism and said lever beam to give a definite lever length to act upon a test beam of certain sectional dimension, and means including a dynamometer to indicate in predetermined terms the applied force required to break said test beam.

4. In a testing machine, a frame, a test beam support carried by said frame, a lever beam, means actuated by said lever beam for placing a test beam under load, a force applying mechanism, and means between said mechanism and said lever beam for varying the effective leverage of said lever beam.

5. In a testing machine, a frame, a test beam support carried by said frame, a lever beam, means actuated by said lever beam for placing a test beam under load, a force applying mechanism, and means between said mechanism and said lever beam settable for giving a plurality of different effective lever lengths to said lever beam.

6. In a testing machine, a frame, a test beam support carried by said frame, a lever beam, means actuated by said lever beam for placing a test beam under load, a force applying mechanism, means between said mechanism and said lever beam settable for giving a plurality of different effective lever lengths to said lever beam, and means including a dynamometer to indicate in predetermined terms the applied force required to break said test beam.

7. In a testing machine, a frame, a test beam support carried by said frame, a lever beam pivotally supported at one end by said frame, a bell crank pivotally supported adjacent said lever beam, a dynamometer connected to one arm of said bell crank, and means connecting the other arm of said bell crank to said lever beam.

8. In a testing machine, a frame, a test beam support carried by said frame, a lever beam pivotally supported at one end from said frame, a bell crank pivotally supported adjacent said lever beam, a dynamometer connected to one arm of said bell crank, means connecting the other arm of said bell crank to said lever beam and removable means for supporting said lever beam in its initial position.

9. In a testing machine, a frame, a test beam support carried by said frame, a lever beam pivotally supported at one end from said frame, a bell crank pivotally supported adjacent said lever beam, a dynamometer connected to one arm of said bell crank, and movable means arranged to connect the other arm of said bell crank to said lever beam at any one of a number of positions.

10. In a testing machine, a frame, a test beam support carried by said frame, a lever beam pivotally supported at one end from said frame, a bell crank pivotally supported adjacent said lever beam, a dynamometer connected to one arm of said bell crank, and a turnbuckle for connecting the other arm of said bell crank to said lever beam at any one of a number of predetermined positions.

ROBERT B. LEWIS.